United States Patent
Busse et al.

(10) Patent No.: US 7,154,233 B2
(45) Date of Patent: Dec. 26, 2006

(54) CONVERTER CIRCUIT WITH COUPLED INDUCTANCES HAVING ASYMMETRICAL AIR GAP ARRANGEMENT

(75) Inventors: Olaf Busse, Munich (DE); Markus Heckmann, Munich (DE); Siegfried Mayer, Moosinning (DE)

(73) Assignee: Patent-Treuhand-Gesellschaft fur Elektrisch Gluhlampen mbH (DE)

( * ) Notice: Subject to any disclaimer, the term of this patent is extended or adjusted under 35 U.S.C. 154(b) by 0 days.

(21) Appl. No.: 11/099,512

(22) Filed: Apr. 6, 2005

(65) Prior Publication Data
US 2005/0218828 A1 Oct. 6, 2005

(30) Foreign Application Priority Data
Apr. 6, 2004 (DE) .................. 10 2004 016 944

(51) Int. Cl.
*H05B 41/16* (2006.01)
(52) U.S. Cl. .............. 315/274; 315/276; 315/278; 315/279; 336/188; 336/187; 336/186
(58) Field of Classification Search .................. None
See application file for complete search history.

(56) References Cited

U.S. PATENT DOCUMENTS

| | | | | |
|---|---|---|---|---|
| 5,485,362 A | 1/1996 | Archer | .......... | 363/24 |
| 5,705,961 A * | 1/1998 | Yee | .......... | 333/131 |
| 2003/0117251 A1* | 6/2003 | Haugs et al. | .......... | 336/182 |
| 2003/0155872 A1 | 8/2003 | Weirich | .......... | 315/291 |
| 2003/0227363 A1 | 12/2003 | Leisten et al. | .......... | 336/178 |

FOREIGN PATENT DOCUMENTS

| | | |
|---|---|---|
| GB | 730656 | 5/1955 |
| WO | WO 01/47324 A1 | 6/2001 |

OTHER PUBLICATIONS

Search Report (dated Jun. 28, 2005; 3 pages total) for related United Kingdom Patent Application No. GB0505073.7.

* cited by examiner

*Primary Examiner*—Tuyet Thi Vo
(74) *Attorney, Agent, or Firm*—Fitch, Even, Tabin & Flannery

(57) ABSTRACT

The invention relates to a converter circuit with coupled inductances L1 and L2 which have a core K having an air gap S which is asymmetrical with respect to the inductances.

12 Claims, 2 Drawing Sheets

CONVERTER CIRCUIT WITH COUPLED INDUCTANCES HAVING ASYMMETRICAL AIR GAP ARRANGEMENT

FIELD OF THE INVENTION

The present invention relates to a converter circuit with coupled inductances, in particular to a SEPIC converter. Such converters are used, in particular, in power factor correction circuits, to be precise in particular in ballasts for lamps.

BACKGROUND OF THE INVENTION

So-called SEPIC converters have the advantage over other converter designs, for example in comparison to step-up converters, that the output voltage of the converter can be set as desired within a relatively wide range and, in particular, may also be less than the voltage amplitude of an AC supply voltage. The circuit design for the SEPIC converter is familiar to those skilled in the art and therefore need not be described in detail here. However, reference will be made in supplementary fashion to the different explanations in the further course of this description.

A storage capacitor, which supplies the downstream circuit elements with a DC voltage, can be charged by a SEPIC converter. In this case, the SEPIC converter generally has the function of a power factor correction circuit which is used to prevent the capacitor from only being charged from the AC voltage when the instantaneous voltage value of the AC voltage is higher than the voltage applied to the capacitor. This prevents the short-term, pulse-like charge currents in the vicinity of the voltage maxima of the AC supply voltage which result on a regular basis in an impermissibly strong harmonic spectrum.

It is also known in the case of SEPIC converters to carry out so-called ripple current compensation. For this purpose, the two inductances of the converter are coupled and specific conditions are maintained when tuning the inductances. This design makes it possible for a high DC component and a very low radiofrequency component to flow through one of the two inductances.

SUMMARY OF THE INVENTION

The present invention is based on the technical problem of specifying an improved SEPIC converter with ripple current compensation.

The invention relates to a SEPIC converter circuit having two input branches, a switch between the first input branch and the second input branch, a first inductance in the first input branch on the input side of the connection of the switch, a capacitor in the first input branch on the output side of the connection of the switch, a second inductance between the first and the second input branches on the output side of the capacitor, a diode in the first input branch on the output side of the connection of the second inductance, a second capacitor between the first and the second input branches, in the case of which the first and the second inductances have a common core with an air gap, and the second inductance for ripple current compensation approximately corresponds to the inductance of a parallel circuit comprising the first and the second inductances, characterized in that the air gap is asymmetrical with respect to the winding in the first and the second inductances and lies to a greater extent in the region of the winding of the second inductance.

In addition, the invention relates to an electronic device having such a converter circuit.

Preferred refinements of the invention are given in the dependent claims and are explained in more detail below.

The invention is based on the fact that, when the two inductances are coupled, as is necessary for ripple current compensation, reference may be made to a common core for the inductances, even if this core is of multi-part design. Two physically separate cores which are nevertheless coupled in the magnetic flux are thus in this case understood to be two parts of a common core. The invention is also based on the fact that an air gap is provided in the common core of the two inductances in order to improve controllability. The invention now consists in providing this air gap such that it is asymmetrical with respect to the two inductances, to be precise in such a way that the core passes through the first inductance to a greater extent than through the second inductance. This does not necessarily mean, as is also described below, that the air gap is provided such that it is asymmetrical with respect to the core itself.

In one preferred refinement, the air gap is not surrounded by the winding of the first inductance, with the result that the latter is thus completely taken up by the core.

The first inductance thus has a tendency to have a relatively high inductance in relation to the number of turns. The first inductance may thus have a small winding and take up a correspondingly small chamber volume. This even applies to a certain extent when the first inductance needs to have a relatively high inductance value in order to fulfill the quantitative conditions for ripple current compensation. These conditions can be reduced to the simple statement that the value of the second inductance needs essentially to correspond to the effective inductance in the case of a parallel circuit comprising the first and the second inductances. If in this case, as is preferred in the context of this invention, a relatively low coupling factor is used between the two inductances, preferably one in the range of 0.6–0.9, the first inductance thus needs to have a relatively high value. Correspondingly, a physical size which is too large can be prevented.

In addition, with the invention markedly lower losses are produced in the first inductance than in the second inductance, since essentially no radiofrequency currents flow in the first inductance as a consequence of the ripple current compensation. However, the second inductance has radiofrequency currents flowing through it and produces correspondingly greater heat losses. It has proved to be favorable if the winding of the second inductance takes up a larger chamber volume such that it is possible to attain, overall, approximately uniform heating of the two windings, but without the differences in the heating also being emphasized in any case by the physical form.

It is also preferable if the windings in the first and the second inductances are axially separate, i.e. have no overlap, for example by a winding element of the first inductance being laid over a winding element, positioned radially further inwards, of the second inductance. Such designs are possible but complicate construction. If, however, "layered" winding guidance is used, in this case the winding elements of the first inductance should preferably be prevented from "seeing" the air gap, i.e. from being in direct contact therewith. Instead, such a direct contact should only be made with winding elements of the second inductance or other inductances.

It has already been mentioned that the air gap should only be asymmetrical with respect to the inductances. It is also preferable for the air gap to be symmetrical with respect to the core itself, and for correspondingly symmetrical core elements to be used. This can be achieved as regards the desired smaller chamber volume for the first inductance. A simple design for the core can thus be achieved, and it is possible to prevent any faults during assembly by replacing asymmetrical core halves etc. In addition, the costs are reduced as a result of the components being uniform.

One further preferred measure consists in a single wire being used for the first inductance, and the radiofrequency litz wire, i.e. a multi-core conductor in which the radiofrequency losses are reduced and the resistance for the radiofrequency components is reduced (skin effect), being used only in the case of the second inductance. The radiofrequency litz wire is not only more expensive but also brings about, given the same line cross section, a greater physical volume as a result of the unavoidable interspaces and, in particular, the insulation between the cores.

With the invention, the two inductances otherwise do not necessarily need to have the same physically uniform design in each case. A plurality of individual inductances may in each case also be used, for example a series connection on the primary side, only part of the coupling being lost. The coupling factor of the effective total inductance (for example on the primary side) is thus correspondingly lower.

One preferred application is, as already mentioned initially, in power factor correction circuits, in particular those in electronic ballasts for light-generating elements. This term is to be understood in this case to encompass lamps of a wide variety of types, but also LEDs including lasers and other optoelectronic, light-generating elements. Particularly preferred is the application of the invention in ballasts for lamps, in particular for low-pressure discharge lamps.

BRIEF DESCRIPTION OF THE DRAWINGS

The invention will be explained in more detail below with reference to an exemplary embodiment, it being possible for the individual features also to be essential to the invention in other combinations. As a precaution, reference is made to the fact that the descriptions above and below also disclose a method for producing and a method for operating the inductances, the converter circuit and the electronic device, in particular the ballast. In the drawings.

DETAILED DESCRIPTION OF THE INVENTION

Figure 1:
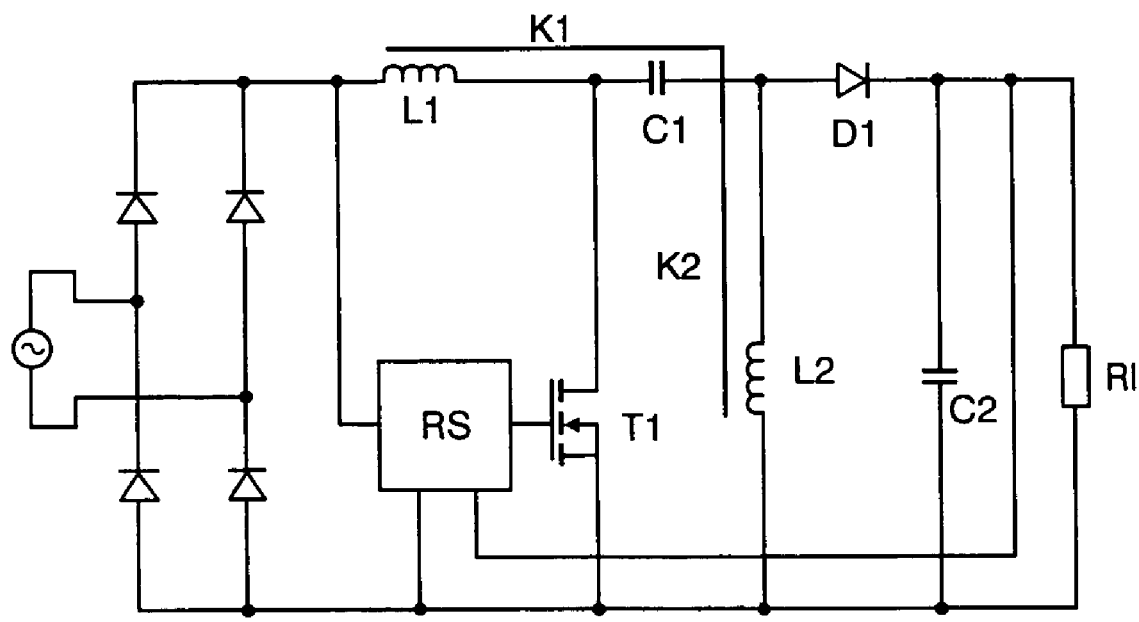
FIG. 1 shows a schematic block circuit diagram of a SEPIC converter circuit according to the invention.

FIG. 1 shows a SEPIC converter circuit according to the invention in an electronic ballast for a low-pressure discharge lamp as an exemplary embodiment. Shown on the left is the fact that an AC supply voltage, for example a conventional domestic power supply system voltage, is rectified via a diode rectifier bridge. In the figure, a rectified, positive potential is thus applied to the line branch extending horizontally at the top and at the bottom there is a rectified, negative potential which is generally connected to ground. The rectified AC voltage forms the input of the SEPIC converter which has the inductances L1 and L2, the capacitor C1, the rectifier diode D1 and the switching transistor T1 and is regulated by the control circuit RS. The inductances have a common core K having two core components K1 and K2. A load RI, which is supplied with a DC voltage made available by the capacitor C2, is connected to the output (illustrated on the right) of the SEPIC converter, i.e. in parallel with a storage capacitor C2. The load RI is a conventional half-bridge oscillator having two switching transistors for generating a radiofrequency AC voltage with which the low-pressure discharge lamp can be operated. Since such circuits are generally known in the prior art, the load is in this case only illustrated by a resistor.

The capacitor C2 acts as a storage capacitor and needs to be charged by the SEPIC converter from the rectified AC voltage to a DC voltage which is as constant as possible. In this case, the current drawn from the power supply system should follow the sinusoidal waveform of the system voltage with as few disruptions as possible.

Owing to an alternating switching operation of the switching transistor T1, the inductance L1 is charged in the switched-on state from the rectified system voltage to a specific current and, in the switched-off state of the switching transistor T1, is discharged to the capacitor C1. In the same way, the inductance L2 is charged during the switched-on times of the switching transistor T1 and discharged to the capacitors C2 and C1 during the switched-off times. (The polarity of the diode D1 should be taken into account). In this case, so-called discontinuous operation results when the switched-off times of the switching transistor T1 are long enough for the current in the rectifier diode D1 to fall to zero. In this case, the capacitor C1 on average remains charged essentially to the value of the instantaneous rectified supply voltage. Owing to a corresponding clock ratio, i.e. the ratio between the switched-on times and the switched-off times, and taking into consideration the load RI, essentially any desired DC voltage can thus be set across the capacitor C2 and may, in particular, be less than the amplitude of the system voltage. The storage capacitor C2 therefore need not necessarily be a capacitor which can withstand particularly high voltages. The capacitor C1 to a certain extent ensures that the two inductances L1 and L2 are decoupled from one another such that, in contrast to the step-up converter, the voltages generated by the inductance L1 do not add up to the instantaneous system voltage.

The switched-on times and the switched-off times together produce a period duration and thus an operating frequency which is given by the switching operation of the switching transistor T1 and thus by the control circuit RS. A typical operating frequency is in the range of a few tens of kHz to approximately 200 kHz.

The two inductances L1 and L2 are coupled via a common core K having two core elements K1 and K2. This design is explained in more detail below with reference to FIGS. 2 and 3. The coupling, together with specific dimensioning for the inductances, serves the purpose of providing ripple current compensation, i.e. serves the purpose of largely suppressing radiofrequency current components in the first inductance L1. This makes it possible for now only the second inductance L2 to "see" radiofrequency current components and for essentially a direct current to flow through the first inductance L1.

Figure 2:
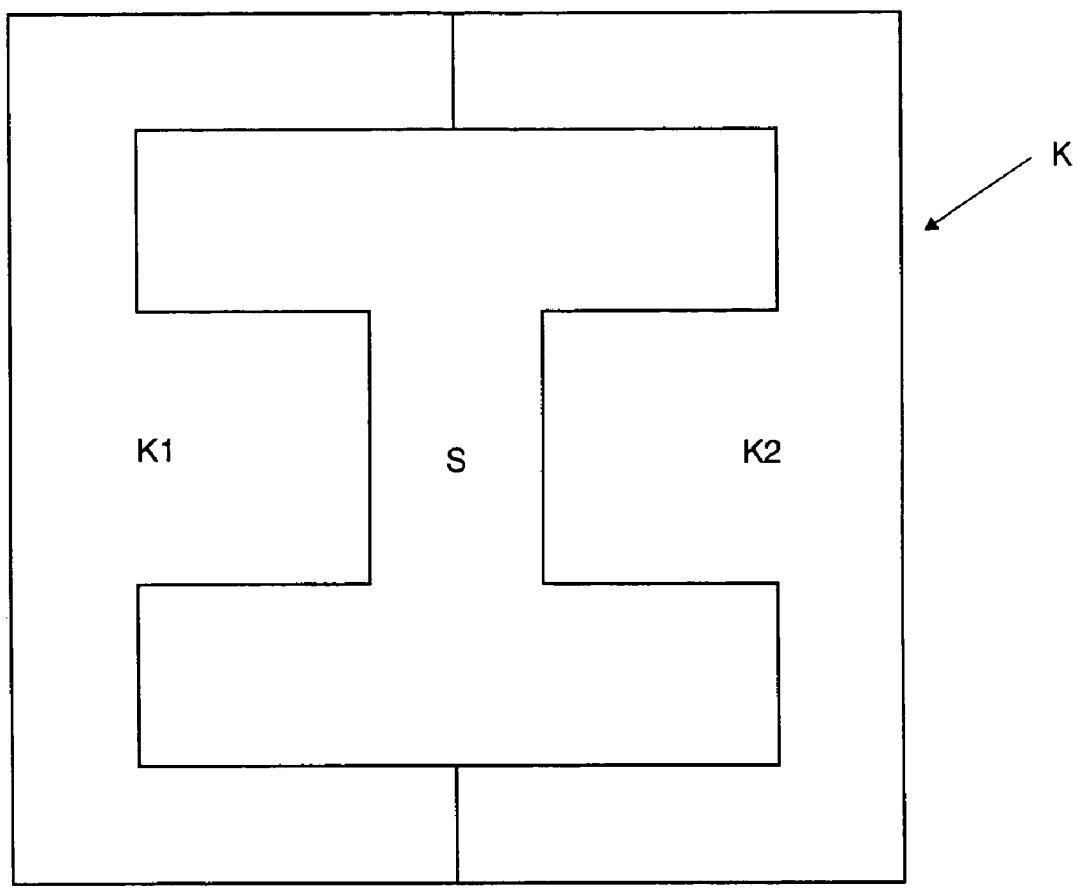
FIG. 2 shows a two-part core of the inductances of the SEPIC converter shown in FIG. 1.
Figure 3:
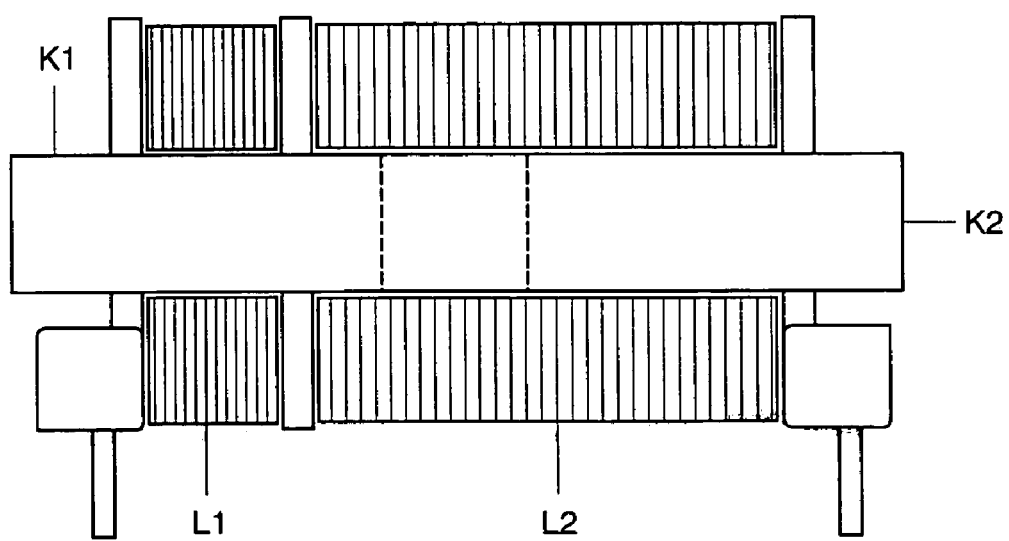
FIG. 3 shows the design of the inductances of the SEPIC converter shown in FIG. 1 with the core shown in FIG. 2.

FIG. 2 in this case shows a plan view of the two-part core K, and FIG. 3 shows a front view of the two inductances L1 and L2 with the core K. In the lower region of FIG. 3 towards the outside on the left and the right, the conventional pin base connections for the inductances L1 and L2 can be seen.

It can be seen that the core K has a similar shape to that of a rectangular eight, apart from an air gap S provided in a middle web, or in other words is formed as two letter "E"s facing each other in mirror-symmetrical fashion. The windings of the two inductances L1 and L2, which are designated below with the same references L1 and L2, are wound onto the middle web. As a result, the inductances are magnetically coupled. The aim for ripple current compensation is for the second inductance L2 to have essentially the value which is measured when the two inductances L1 and L2 are connected in parallel (with the same winding sense). Since in this case a relatively low coupling factor is desired between the two inductances L1 and L2 in the range of 0.6–0.9, in this case the first inductance L1 needs to have a value which is not too small. In the present case, the coupling factor is approximately 0.65 with a coupling inductance of approximately 370 µH, the nominal first inductance L1 being 765 µH and the nominal second inductance L2 being 430 µH. The abovementioned parallel inductance L1∥L2 is 425 µH.

Owing to an asymmetrical position of the air gap S with respect to the two inductances L1 and L2, the desired, virtually doubled inductance L1 can be achieved with a comparatively low number of turns of 90 turns (89 turns in the case of L2).

The windings of the inductances L1 and L2 are in each case not layered in order to keep the design simple and to clearly space the windings of the first inductance axially apart from the air gap. In principle, however, even a radial spacing from the air gap would result in the effect according to the invention, for example, if part of the winding of the first inductance L1 were to be radially outside part of the winding of the second inductance L2.

The air gap S, as is clearly shown in FIG. 3 by the dashed lines and in accordance with the vertical lines in FIG. 2, is positioned completely within the winding L2. The air gap S can thus on the one hand improve controllability in the desired manner and, on the other hand, reduces essentially only the second inductance L2. In addition, the magnetic field scattering in the region of the air gap S only engages in the turns of the inductance L2 and thus only produces eddy current losses there. Since the first inductance L1 also essentially has a direct current flowing through it, single wire can be used there, which means that the physical size, as illustrated in FIG. 3, can be drastically reduced despite an almost identical number of turns. Since the radiofrequency losses occurring in the second inductance L2 result in considerably increased heating, overall approximately uniform heating of the entire structure is achieved taking into consideration the markedly smaller volume of the first inductance L1.

In addition, for reasons of space and for the purpose of simplifying production, a design is selected which provides only one chamber for each inductance L1 and L2, the chambers being separated from one another by the radial walls illustrated in FIG. 3.

FIGS. 2 and 3 illustrate, in particular, the fact that the asymmetry of the air gap S with respect to the inductances L1 and L2 does not necessarily require asymmetry of the core structure. In the present case, in fact identical core halves K1 and K2 are used such that they face one another in mirror-symmetrical fashion such that faults can be prevented by different core components being replaced. The air gap is approximately 2.2 mm in the axial direction, and the overall dimensions of the core are approximately 27 mm squared (cf. FIG. 2). A particularly compact and simple design can thus provide an optimum solution for the inductances in the SEPIC converter shown in FIG. 1.

It should also be mentioned that a third winding, which is initially not required for the operation of the SEPIC converter and which is not illustrated in FIG. 3, is applied to the winding of the inductance L2. In this case there are only six turns which can generate a supply power for the control circuit RS shown in FIG. 1 as soon as the inductances have current flowing through them. However, there are naturally also other supply solutions which are conceivable.

The invention claimed is:

1. A SEPIC converter circuit having
two input branches,
a switch (T1) between the first input branch and the second input branch,
a first inductance (L1) in the first input branch on the input side of the connection of the switch (T1),
a capacitor (C1) in the first input branch on the output side of the connection of the switch (T1),
a second inductance (L2) between the first and the second input branches on the output side of the capacitor (C1),
a diode (D1) in the first input branch on the output side of the connection of the second inductance (L2),
a second capacitor (C2) between the first and the second input branches,
in the case of which the first and the second inductances (L1, L2) have a common core (K) with an air gap (S),
and the second inductance (L2) for ripple current compensation approximately corresponds to the inductance of a parallel circuit comprising the first and the second inductances (L1, L2),
characterized in that the air gap (S) is asymmetrical with respect to the winding in the first and the second inductances (L1, L2) and lies to a greater extent in the region of the winding of the second inductance (L2).

2. The converter circuit as claimed in claim 1, in which the coupling factor between the first and the second inductances (L1, L2) is between 0.6 and 0.9, inclusive.

3. The converter circuit as claimed in claim 1, in which the chamber volume of the winding of the first inductance (L1) is smaller than the chamber volume of the winding of the second inductance (L2).

4. The converter circuit as claimed in claim 1, in which the windings of the first and the second inductances (L1, L2) are axially separate.

5. The converter circuit as claimed in claim 1, in which the core (K) comprises two symmetrical core halves (K1, K2).

6. The converter circuit as claimed in claim 1, in which the winding of the first inductance (L1) is made of a single wire, and the winding of the second inductance (L2) is made of a radiofrequency litz wire.

7. The converter circuit as claimed in claim 1, in which the air gap (S) is surrounded exclusively by the winding of the second inductance (L2).

8. The converter circuit as claimed in claim 7, in which the coupling factor between the first and the second inductances (L1, L2) is between 0.6 and 0.9, inclusive.

9. The converter circuit as claimed in claim 7, in which the chamber volume of the winding of the first inductance (L1) is smaller than the chamber volume of the winding of the second inductance (L2).

10. An electronic device having the converter circuit as claimed in claim 1 as a power factor correction circuit.

11. The electronic device as claimed in claim 10, which is designed as an electronic ballast for a light-generating element.

12. The electronic ballast as claimed in claim 11, which is designed to supply power to a low-pressure discharge lamp.

* * * * *